United States Patent
Himayat et al.

(10) Patent No.: US 10,142,894 B2
(45) Date of Patent: Nov. 27, 2018

(54) INTERWORKING/CO-EXISTENCE OF INTEGRATED WLAN/3GPP RAT ARCHITECTURES WITH LEGACY WLAN/3GPP INTERWORKING SOLUTIONS

(71) Applicant: Intel Corporation, Santa Clara, CA (US)

(72) Inventors: Nageen Himayat, Fremont, CA (US); Alexander Sirotkin, Petach Tikva (IL); Jing Zhu, Portland, OR (US); Alexandre Stojanovski, Paris (FR); Mo-han Fong, Sunnyvale, CA (US); Vivek G. Gupta, San Jose, CA (US); Huaning Niu, Milpitas, CA (US); Pingping Zong, Randolph, NJ (US); Konstantinos Dimou, Santa Clara, CA (US); Shu-Ping Yeh, New Taipei (TW); Shilpa Talwar, Los Altos, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 14/583,336

(22) Filed: Dec. 26, 2014

(65) Prior Publication Data

US 2015/0350989 A1    Dec. 3, 2015

Related U.S. Application Data

(60) Provisional application No. 62/007,391, filed on Jun. 3, 2014.

(51) Int. Cl.
*H04L 12/66*     (2006.01)
*H04W 36/00*     (2009.01)
(Continued)

(52) U.S. Cl.
CPC ........ *H04W 36/0066* (2013.01); *H04W 84/12* (2013.01); *H04W 88/06* (2013.01); *H04W 88/10* (2013.01)

(58) Field of Classification Search
CPC . H04W 48/18; H04W 48/16; H04W 36/0022; H04W 36/30; H04W 28/08;
(Continued)

(56) References Cited

U.S. PATENT DOCUMENTS 8,130,718 B2    3/2012 Shaheen
8,446,830 B2    5/2013 Wu et al.
(Continued)

FOREIGN PATENT DOCUMENTS

WO    2013138708 A1    9/2013
WO    2014047545 A2    3/2014
WO    WO 2015/187284    12/2015

OTHER PUBLICATIONS

International Search Report and Written Opinion of corresponding PCT Application PCT/US15/28963 dated Aug. 27, 2015.
(Continued)

*Primary Examiner* — Hanh N Nguyen
(74) *Attorney, Agent, or Firm* — Patent Capital Group (57) ABSTRACT

An integrated WLAN/WWAN architecture is described, in which signaling used to control the integration of the WLAN/WWAN architecture is performed over the Radio Resource Control ("RRC") plane. The integrated architecture may provide a network-controlled framework for performing traffic steering and radio resource management. Additionally, according to the disclosure provided herein, the integrated architecture may interwork with legacy systems (e.g., architectures that do not support the integrated WLAN/WWAN architecture).

24 Claims, 7 Drawing Sheets

(51) Int. Cl.
*H04W 84/12* (2009.01)
*H04W 88/10* (2009.01)
*H04W 88/06* (2009.01)

(58) Field of Classification Search
CPC ... H04W 40/02; H04W 76/025; H04W 36/14; H04W 12/06; H04W 36/00
USPC ............ 370/338, 329, 468, 395.21, 352–356
See application file for complete search history.

(56) References Cited

U.S. PATENT DOCUMENTS

| | | | | |
|---|---|---|---|---|
| 9,313,697 | B2* | 4/2016 | Xiang | H04W 36/0066 |
| 9,432,885 | B2* | 8/2016 | Kim | H04W 36/0022 |
| 2013/0242783 | A1 | 9/2013 | Horn et al. | |
| 2014/0003239 | A1 | 1/2014 | Etemad et al. | |
| 2014/0023041 | A1 | 1/2014 | Zhao et al. | |
| 2014/0064068 | A1* | 3/2014 | Horn | H04W 28/0289 370/230 |
| 2016/0044567 | A1* | 2/2016 | Baghel | H04W 28/08 370/331 |

OTHER PUBLICATIONS

Third Generation Partnership Project (3GPP), Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, TR 23.852 V12.0.0.

3GPP, "Technical Specification Group Radio Access Network; Study on Wireless Local Area Network (WLAN)—3GPP Radio Interworking (Release 12)," Dec. 2013, TR 37.834 V12.0.0.

PCT International Preliminary Report on Patentability in PCT International Application Serial No. PCT/US2015/028693 dated Dec. 6, 2016 (9 pages).

"3rd Generation Partnership Project; Technical Specification Group Services and System Aspects; Architecture enhancements for non-3GPP accesses (Release 12)", 3GPP Draft; Interim Draft_23402-050, 3rd Generation Partnership Project (3GPP), Mobile Competence Centre; 650, Route Des Lucioles; F-06921 Sophia-Antipolis Cedex; France (submitted in 4 parts); Apr. 3, 2014.

Intel Corporation: "Evolution of WLAN/3GP radio interworking towards tight integration," 3GPP Draft; RP-140237 LTE-WLAN Tight Integration V4, 3rd Generation Partnership Project (3GPP), Mobile Competence Centre; 650, Route Des Lucioles; F-06921 Sophia-Antipolis Cedex; France; vol. TSG RAN, No. Fukuoka, Japan; Mar. 3, 2014-Mar. 6, 2014; Mar. 3, 2014.

Partial supplementary European Search Report dated Dec. 21, 2017 in connection with EP Application No. 15802415.8, 18 pages.

\* cited by examiner

INTERWORKING/CO-EXISTENCE OF INTEGRATED WLAN/3GPP RAT ARCHITECTURES WITH LEGACY WLAN/3GPP INTERWORKING SOLUTIONS

CROSS-REFERENCE TO RELATED APPLICATIONS

The present application claims the benefit of U.S. Provisional Patent Application No. 62/007,391, which was filed on Jun. 3, 2014, the contents of which are hereby incorporated by reference as though fully set forth herein.

BACKGROUND

Growth in data traffic driven by smart phone devices, tablets, etc. can strain the capacity of wireless networks. One approach, used by the wireless industry, to address the growth in data traffic has been network densification wherein small cells are used to increase reuse of licensed spectrum, which continues to be scarce and expensive. Additionally, network operators have also increasingly utilized unlicensed spectrum (e.g., WiFi spectrum) to cope with the increasing capacity demand.

One industry trend facilitating greater cooperation across licensed and unlicensed radio networks is the adoption and deployment of integrated multi-radio small cells with co-located unlicensed (e.g., WiFi) and licensed radio spectrum interfaces. Integrated cells allow for leveraging common infrastructure and site locations, reducing the operational and capital expenditures of network operators. As networks move towards smaller cell sizes, the footprints of cellular and WiFi coverage may increasingly overlap, making such deployments feasible.

While some networks may incorporate integrated cells, other networks (or different portions of the same network) may include legacy devices, without such integrated functionality. For example, a user equipment ("UE") may move from a coverage area of (or be handed over from) an integrated cell to a legacy cell (e.g., an evolved Node B ("eNB") that does not support an integrated mode, in conjunction with a wireless access point ("AP")). As another example, a UE may be handed off from a wireless AP, of an integrated cell, to a legacy wireless AP (e.g., a wireless AP that does not receive control signaling from an eNB).

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As used herein, a "wireless local area network ('WLAN')" may refer to a wireless computer network that links two or more devices using a wireless distribution method that includes relatively short ranges. A WLAN may be used to create wireless networks within a limited area such as a home or office building. One example of a radio technology that may be used to implement a WLAN is WiFi (i.e., using Institute of Electrical and Electronics Engineers' ("IEEE") 802.11-based standards). WLANs are typically implemented using unlicensed radio spectrum (i.e., radio frequencies that can be used without a license from a controlling government entity). In contrast to WLANs, "wireless wide area networks ('WWANs')," as used herein, may refer to networks that provide wireless access over larger areas. One example of a WWAN is a cellular network implemented using licensed radio spectrum. From a user's perspective, WWAN coverage may be provided seamlessly over a number of cells, in the cellular network, to potentially create a large area of uninterrupted network coverage. One example of a WWAN is a cellular radio network based on 3rd Generation Partnership Project ("3GPP") Long Term Evolution ("LTE") standards.

An integrated WLAN/WWAN Radio Access Technology ("RAT") architecture, as described herein, may allow for relatively tight coupling between WLAN and WWAN radio networks and for Radio Access Networks ("RANs"), in which simultaneous use of radio resources between the two RATs is employed. The architecture also allows for exploiting the reliability and the wide coverage of the WWAN to improve user experience over unlicensed spectrum. The WWAN link (e.g., the 3GPP LTE link) may be used as a control and mobility anchor for the WiFi radios in unlicensed spectrum, facilitating seamless inclusion of WiFi as a "virtual" or "extension" carrier in the 3GPP operator's RAN. With the integrated architecture, data may be offloaded from the WWAN to the WLAN but still controlled via the WWAN. For example, an eNB of a Long Term Evolution ("LTE") network may communicate control signaling to a WLAN AP, in order to cause the WLAN AP to connect to a UE (e.g., over a proprietary link and/or a modified 3GPP X2 interface).

Consistent with concepts described herein, a Radio Resource Control ("RRC") plane signaling protocol may be used to support an integrated WWAN/WLAN RAT. The RRC control plane protocol may allow the WLAN and WWAN user plane to be coupled at or above the media access control ("MAC") layer and may leverage the existing WWAN carrier aggregation framework. The WWAN/WLAN RAT architecture may include a network-controlled framework (potentially using information from mobile devices to assist in the control) for traffic steering and performing radio resource management.

In one implementation described herein, RAN anchored Layer 2 integration of WiFi (WLAN) and LTE 3GPP radio interfaces (WWAN) is based on LTE control of the end-to-end service, session setup, and bearer mobility. The WiFi link may be operated as a secondary carrier ("SCell") for data offload under LTE control, and the LTE RAT may serve as the primary carrier ("PCell"). A UE may be in a "connected" mode on the LTE link regardless of whether traffic is routed across the WLAN or the LTE link. The WLAN carrier may be coupled above the MAC layer.

As further described herein, an integrated WLAN/WWAN architecture may be implemented in conjunction with one or more legacy systems. For example, some deployed WLAN devices (e.g., "legacy" WLAN APs) and/or eNBs (e.g., "legacy" eNBs) may not be incorporated with an integrated WLAN/WWAN RAT architecture. Specifically, for instance, legacy WLAN APs may not communicate with (or be capable of communicating with) eNBs, and/or legacy eNBs may not communicate with (or be capable of communicating with) WLAN APs.

In some implementations, WLAN APs, associated with integrated APs, may support multiple modes, such as an integrated mode and a legacy mode. In the legacy mode, the WLAN AP may carry user plane and/or control plane traffic to a packet data network ("PDN") gateway ("PGW") via an S2 interface (e.g., an S2a interface, an S2b interface, an S2c interface, etc., as defined by in one or more 3GPP standards—S2a, S2b, S2c, and/or similar interfaces are referred to herein as "S2" interfaces), and/or may carry user plane traffic to a PDN via a traditional modem/gateway or via another technique.

As further described herein, some implementations may provide for non-seamless WLAN offload ("NSWO") in an integrated WLAN/WWAN architecture. For instance, RRC signaling may be used to advertise NSWO capabilities of an eNB and/or to enforce NSWO-related policies (e.g., specific traffic flows, application types, WLAN APs, UEs, etc., that are authorized for NSWO).

In one implementation, a system may include a base station component, associated with a wireless telecommunications network, to communicate with a UE using RRC signaling; a WLAN component to communicate with the UE using unlicensed frequency spectrum; and processing circuitry to execute processor-executable instructions. Executing the processor-executable instructions may cause the system to establish, by the WLAN component, connection to a PDN via an Internet service provider ("ISP"); provide, by the WLAN component and to the base station component, WLAN connection information, the WLAN connection information specifying parameters associated with connecting to the WLAN component using the unlicensed frequency spectrum; receive, by the base station component and from the UE, a request to perform an NSWO procedure; provide, by the base station component and to the UE via RRC signaling, based on the request to perform the NSWO procedure, the WLAN connection information; and establish, by the WLAN component, a WLAN connection with the UE in accordance with the NSWO procedure being performed by the UE.

Additionally, the WLAN connection information may include at least one of: a Service Set Identifier ("SSID") associated with the WLAN component, a Basic SSID ("BSSID") associated with the WLAN component, a Homogeneous Extended SSID ("HESSID") associated with the WLAN component, a virtual Media Access Control ("v-MAC") value associated with the WLAN component, or a security key associated with the WLAN component.

The WLAN component may additionally configured to connect to the PDN via a core network of the wireless telecommunications network. In some implementations, the WLAN connection information may be WLAN connection information that is designated for NSWO procedures, and the WLAN component may be associated with second WLAN connection information that is designated for connecting to the PDN via the core network. Traffic, associated with connections made using the second WLAN connection information, may be sent to the PDN via the core network through at least one of: an S2 interface, or an S1 interface, via an evolved node B ("eNB") associated with the wireless telecommunications network.

In some implementations, the request from the UE, to perform the NSWO procedure, may be received via RRC signaling. In some implementations, the UE may receive policy information from a Mobility Management Entity ("MME") or an Access Network Discovery and Selection Function ("ANDSF"). The policy information may indicate at least one of: a type of traffic that is authorized to be offloaded using an NSWO procedure, an application for which traffic is authorized to be offloaded using an NSWO procedure, or an Access Point Name ("APN") for which traffic is authorized to be offloaded using an NSWO procedure. In some implementations, the base station component may communicate with the WLAN component via a modified X2 interface.

In one implementation, a UE may include a WWAN component to connect to a wireless telecommunications network using licensed frequency spectrum; a WLAN component to connect to one or more wireless APs using unlicensed frequency spectrum; and processing circuitry to execute processor-executable instructions. Executing the processor-executable instructions causes the UE apparatus to: connect, by the WLAN component, to a first WLAN AP; receive, by the WWAN component and via RRC signaling, WLAN connection information regarding a second WLAN AP; and connect, by the WLAN component and using the WLAN connection information, to the second WLAN AP.

In some implementations, executing the processor-executable instructions may further cause the UE apparatus to receive, by the WWAN component, an instruction to release the connection to the second WLAN AP; and release, by the WLAN component and based on the received instruction, the connection to the second WLAN AP. In some implementations, the instruction (to release the connection) may be received via RRC signaling. In some implementations, after releasing the connection to the second WLAN AP, the UE apparatus may connect to the first WLAN AP.

In one implementation, the first WLAN AP may communicate with a PGW of the wireless telecommunications network via an S2 interface, and the second WLAN AP may communicate with the PGW via a base station of the wireless telecommunications network. In some implementations, the first WLAN AP and the second WLAN AP may correspond to different logical portions of an integrated AP.

Additionally, the first WLAN AP may be associated with first WLAN connection information, and the second WLAN AP may be associated with second WLAN connection information. Particular connection information may include at least one of: a Service Set Identifier ("SSID") associated with the WLAN component, a Basic SSID ("BSSID") associated with the WLAN component, a Homogeneous Extended SSID ("HESSID") associated with the WLAN component, a virtual Media Access Control ("v-MAC") value associated with the WLAN component, or a security key associated with the WLAN component.

Executing the processor-executable instructions may further cause the UE apparatus to receive, by the WWAN component and via RRC signaling, WLAN connection information regarding the first WLAN AP. The UE apparatus may use the WLAN connection information, regarding the first WLAN AP, to connect to the first WLAN AP.

Executing the processor-executable instructions may, additionally, or alternatively, further cause the UE apparatus to receive, from an Access Network Discovery and Selection Function, WLAN connection information regarding the first WLAN AP, wherein the UE apparatus uses the WLAN connection information, regarding the first WLAN AP, to connect to the first WLAN AP.

In one implementation, a UE apparatus may include a WWAN component to connect to one or more wireless telecommunications networks using licensed frequency spectrum; a WLAN component to connect to one or more wireless APs using unlicensed frequency spectrum; and processing circuitry to execute processor-executable instructions. Executing the processor-executable instructions causes the UE apparatus to connect, by the WWAN component, to a first base station of the one or more wireless telecommunications networks; receive, by the WWAN component, WLAN connection information regarding a particular WLAN AP; connect, by the WLAN component and using the WLAN connection information, to the particular WLAN AP; connect, based on a handover procedure, to a second base station of the one or more wireless telecommunications networks; and terminate, based on the handover procedure, the connection to the particular WLAN AP.

Executing the processor-executable instructions may further cause the UE apparatus to connect, subsequent to terminating the connection to the particular WLAN AP, to another WLAN AP. In some implementations, the connection to the particular WLAN AP may be terminated based on information, provided to the particular WLAN AP from the first base station, that the UE has been handed off from the first base station. In some implementations, the WLAN connection information may be received from the base station via RRC signaling. The handover procedure may, in some implementations, based on one or more protocols suitable for connectivity via an S2 interface.

In one implementation, a UE apparatus may include WWAN connection means for connecting to one or more wireless telecommunications networks using licensed frequency spectrum; WLAN connection means for connecting to one or more wireless APs using unlicensed frequency spectrum; and processing means for executing processor-executable instructions. Executing the processor-executable instructions may cause the UE apparatus to connect, by the WWAN connection means, to a first base station of the one or more wireless telecommunications networks; receive, by the WWAN connection means, WLAN connection information regarding a particular WLAN AP; connect, by the WLAN connection means and using the WLAN connection information, to the particular WLAN AP; connect, based on a handover procedure, to a second base station of the one or more wireless telecommunications networks; and terminate, based on the handover procedure, the connection to the particular WLAN AP.

Additionally, the connection to the particular WLAN AP may be terminated based on information, provided to the particular WLAN AP from the first base station, that the UE has been handed off from the first base station. The WLAN connection information may be received from the base station via RRC signaling.

Figure 1:
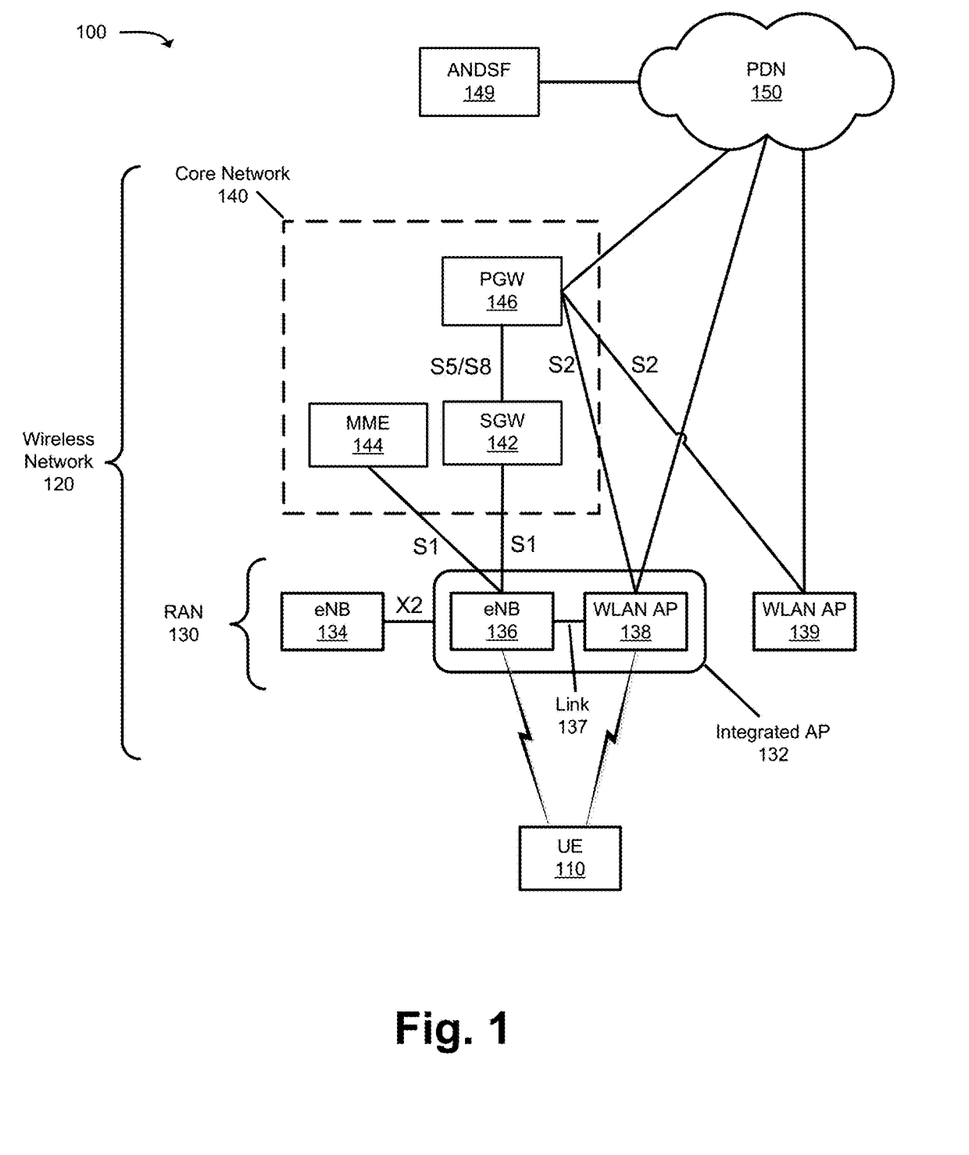
FIG. 1 is a diagram of an example environment in which systems and/or methods described herein may be implemented.

FIG. 1 is a diagram of an example environment 100, in which systems and/or methods described herein may be implemented. As illustrated, environment 100 may include UE 110, which may obtain network connectivity from wireless network 120. Although a single UE 110 is shown, for simplicity, in FIG. 1, in practice, multiple UEs 110 may operate in the context of a wireless network. Wireless network 120 may provide access to one or more external networks, such as PDN 150. The wireless network may include radio access network ("RAN") 130 and core network 140. Some or all of RAN 130 may be associated with a network operator that controls or otherwise manages core network 140. Core network 140 may include an Internet Protocol ("IP")-based network, such as System Architecture Evolution ("SAE") core network or a General Packet Radio Service ("GPRS") core network.

UE 110 may include a portable computing and communication device, such as a personal digital assistant ("PDA"), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as eNBs, and are illustrated as eNBs 134 and 136. Some of the eNBs, such as eNB 136, may be associated with an integrated AP, such as integrated AP 132. Other eNBs, such as eNB 134, may not be associated with an integrated AP, and may be referred to as "legacy" eNBs. Integrated AP 132, in addition to providing functionality associated with a traditional eNB, may also include one or more WLAN (e.g., WiFi) APs 138. Integrated AP 132 may provide RAN-based coordination and simultaneous use of the radio resources between different RATs (e.g., 3GPP cellular (WWAN) and WiFi (WLAN)).

Figure 2:
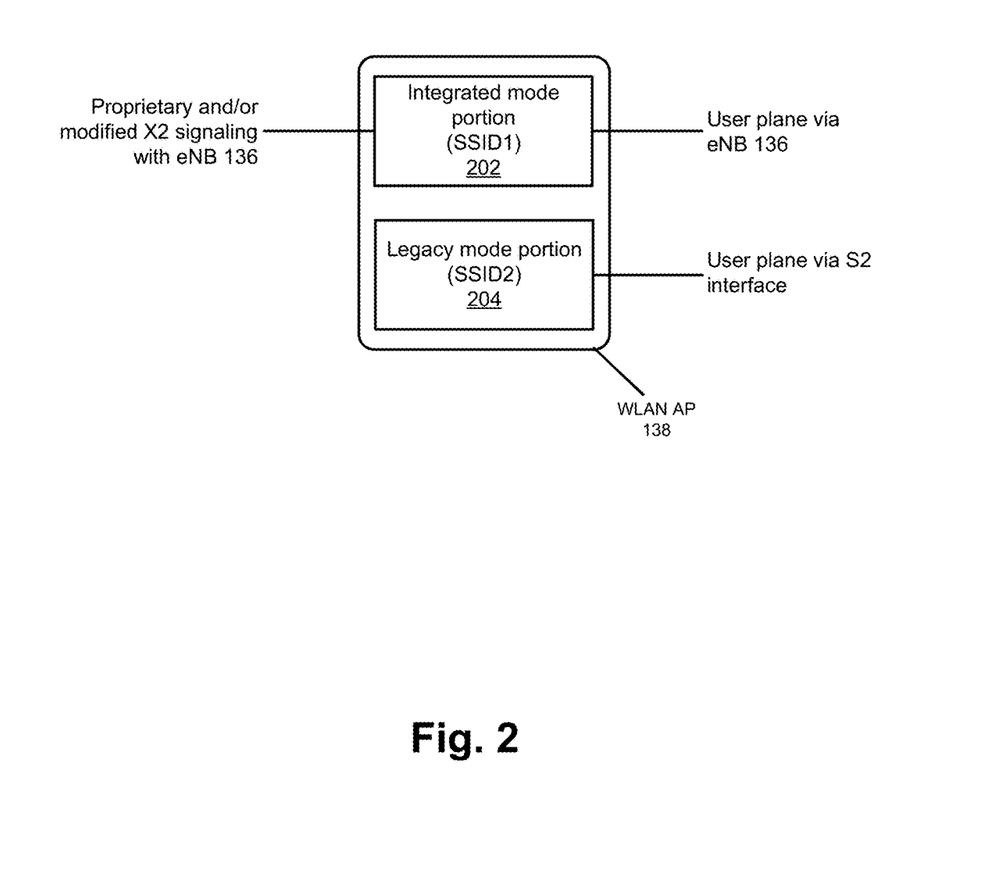
FIG. 2 illustrates example functional components of a wireless local access network ("WLAN") AP, of an integrated AP.

In some implementations, WLAN AP 138 may operate in one or more "modes." For example, FIG. 2 illustrates example functional components 202 and 204, which may correspond to the modes in which WLAN AP 138 may operate. For example, as shown, WLAN AP 138 may include integrated mode portion 202 and legacy mode portion 204. Integrated mode portion 202, of WLAN AP 138, may include hardware circuitry and/or software logic to send and/or receive signaling to and/or from eNB 136 (e.g., via link 137). The signaling may be proprietary signaling, and/or may be signaling according to a modified X2 interface (e.g., a modified version of an X2 interface defined by a 3GPP standard). Legacy mode portion 204, of WLAN AP 138, may operate independently of eNB 136. For example, legacy mode portion 204 may communicate, via WiFi (or other wireless protocols) with UE 110, independent of control signaling received from eNB 136. In some implementations, WLAN AP 138 may simultaneously operate in legacy mode and integrated mode, while in some implementations, WLAN AP 138 may operate in only one mode at a given time (i.e., either integrated mode or legacy mode).

As further shown in FIG. 2, integrated mode portion 202 may send and/or receive user plane data to and/or from eNB 136 (e.g., via link 137). Legacy mode portion 204 may send and/or receive user plane data to and/or from PGW 146 via, for example, an S2 interface (e.g., S2a, S2b, S2c, and/or a similar interface). For instance, in some implementations, legacy mode portion 204 may communicate with PGW 146 via an S2 gateway (not shown) and/or another intervening device.

Integrated mode portion 202 and legacy mode portion 204 may each be associated with a different service set identifier ("SSID") and/or virtual MAC identifier ("v-MAC"). For example, integrated mode portion 202 may be associated with the example SSID "SSID1," while legacy mode portion 204 may be associated with the example SSID "SSID2." Via these multiple SSIDs, the different portions of WLAN AP 138 may be discovered and connected to by user device 110. In some implementations, a particular user device 110 may simultaneously connect to integrated mode portion 202 and to legacy mode portion 204. For example, user device 110 may have the capability to connect to multiple WLANs, and may connect to the different portions of WLAN AP 138 by discovering SSID1 and SSID2.

Returning to FIG. 1, WLAN AP 139 may be a "legacy" WLAN AP (e.g., a WLAN AP that is not associated with an integrated AP). WLAN APs 138 and 139 may carry user plane and/or control plane traffic to PGW 146 via an S2 interface. Additionally, or alternatively, WLAN AP 138 and/or WLAN AP 139 may carry user plane and/or control plane traffic to PDN 150 via some other technique, such as through a modem and/or gateway of an ISP (e.g., an ISP that is separate from a provider of core network 140). eNBs (such as eNBs 134 and 136) may communicate with each other via an X2 interface (e.g., as defined by a 3GPP standard). In some implementations, eNBs may obtain capability information regarding other eNBs (e.g., information regarding whether a particular eNB supports integrated mode, which may be used during handovers from one eNB to another).

In some implementations, integrated AP 132 may be implemented such that eNB 136 and AP 138 may be physically co-located as part of an integrated multi-radio small cell. Alternatively or additionally, integrated AP 132 may be implemented such that eNB 136 and AP 138 are physically separated but logically co-located, such as via an external, low-latency standardized or proprietary interface that may be used to connect eNB 136 with AP 138. In either case, link 137, which may include a proprietary or other type of low-latency interface, may be implemented between eNB 136 and AP 138. In some implementations, signaling over link 137 may be a modified implementation of the X2 interface. The coverage ranges of eNB 136 and AP 138 may, in some implementations, be different and may or may not overlap.

Core network 140 may include an IP-based network. In the 3GPP network architecture, core network 140 may include an Evolved Packet Core ("EPC"). As illustrated, core network 140 may include serving gateway ("SGW") 142, Mobility Management Entity ("MME") 144, and packet data network gateway ("PGW") 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 134/136. SGW 142 may generally handle user (data) plane traffic. MME 144 may include one or more computation and communication devices that perform operations to register UE 110 with core network 140, establish bearer channels associated with a session with UE 110, hand off UE 110 from one eNodeB to another, and/or perform other operations. MME 144 may generally handle control plane traffic. SGW 142 may include one or more network devices that aggregate traffic received from one or more eNBs and/or integrated APs 132. SGW 142 may generally handle user (data) plane traffic.

PGW 146 may include one or more devices that act as the point of interconnect between core network 140 and external IP networks, such as PDN 150, and/or operator IP services. In some implementations, PGW 146 may additionally, or alternatively, serve as the point of interconnect between WLAN AP 138 and/or WLAN AP 139 and PDN 150 (e.g., via an S2 interface). PGW 146 may route packets to and from the access networks, and/or the WLAN APs, and the external IP networks.

Access network discovery and selection feature ("ANDSF") 149 may include one or more devices that provide information to UE 110 regarding non-3GPP access networks (e.g., regarding networks implemented by WLAN AP 138, WLAN 139, etc.). In some implementations, ANDSF 149 may be accessible via a public IP address or other identifier (e.g., via PDN 150, as shown). Additionally, or alternatively, ANDSF 149 may be a network element within core network 140. In some implementations, ANDSF 149 may store information regarding WLAN APs (e.g., WLAN APs 138 and/or 139), such as identifiers regarding WLAN APs (including SSIDs and/or v-MACs of different portions of WLAN APs, such as portions described above with respect to FIG. 2). ANDSF 149 may additionally, or alternatively, store information regarding non-seamless WLAN offload ("NSWO") policies, such as types of traffic that are authorized for NSWO, UEs 110 that are authorized for NSWO, etc.

PDNs 150 may each include packet-based networks. PDN 150 may include one or more external networks, such as a public network (e.g., the Internet) or proprietary networks that provide services that are provided by the operator of core network 140 (e.g., IP multimedia ("IMS")-based services, transparent end-to-end packet-switched streaming services ("PSSs"), or other services).

A number of communication interfaces, between various devices, are labeled in FIG. 1. The labeled communication interfaces may represent various protocols that are used to communicate between the various devices illustrated in FIG. 1. For example, eNBs 134 and 136 may communicate with SGW 142 using an S1 interface (e.g., as defined by a 3GPP standard), and SGW 142 may communicate with PGW 146 using an S5/S8 interface (e.g., as defined by a 3GPP standard).

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIGS. 1 and 2, these connections should be interpreted as logical communication pathways, and in practice, one or more intervening devices (e.g., routers, gateways, modems, switches, hubs, etc.) may be present.

Figure 3:
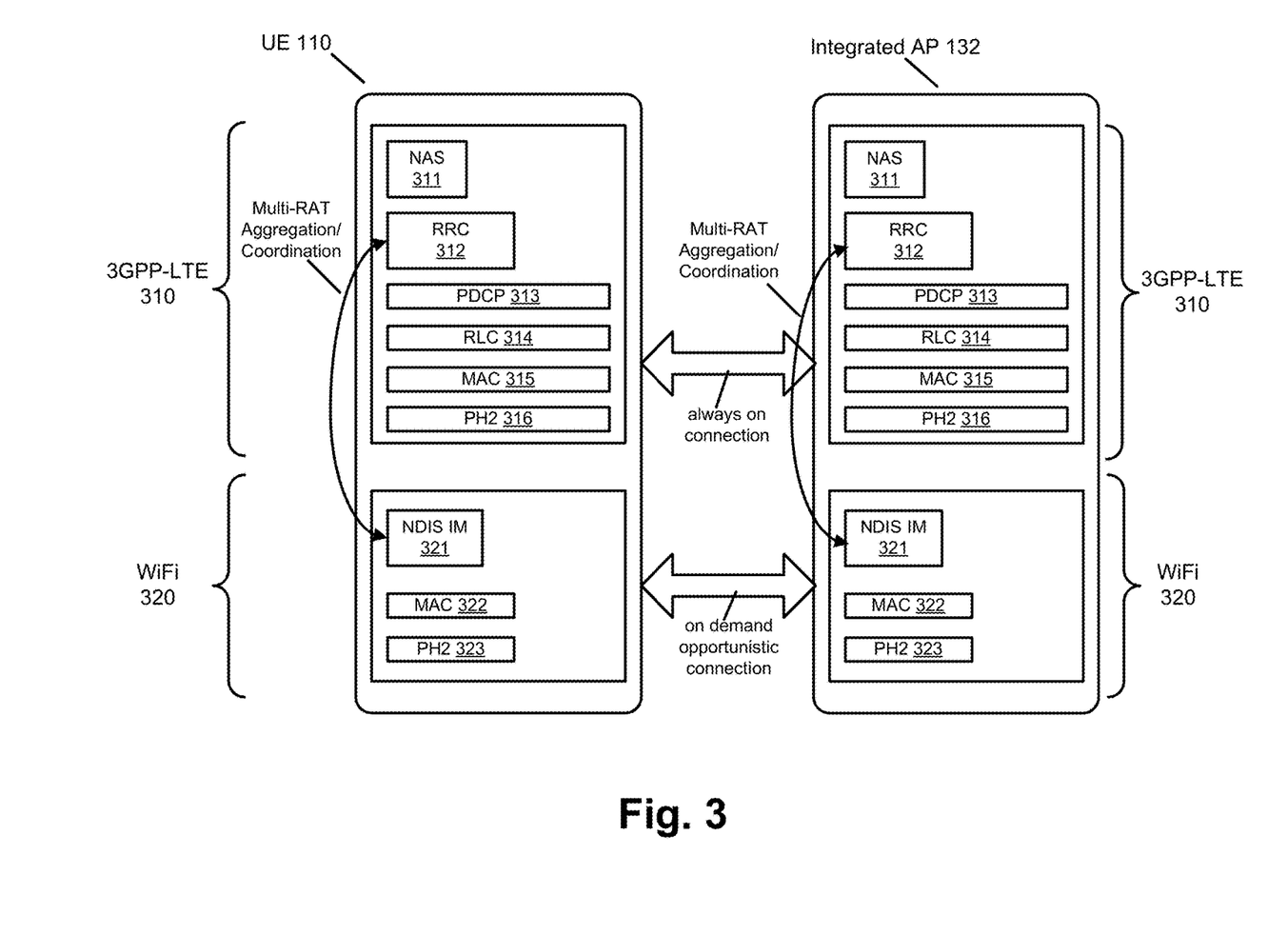
FIG. 3 is a diagram conceptually illustrating an example of various protocol layers, and the interaction of the protocol layers.

FIG. 3 is a diagram conceptually illustrating an example of various protocol layers, and the interaction of the protocol layers, in UE 110 and integrated AP 132. As previously discussed, UE 110 and integrated AP 132 may be devices that include multiple RATs (i.e., multi-mode radio devices), such as devices that include WWAN and WLAN RATs. In the implementations described below, UE 110 and integrated AP 132 will be particularly described as including 3GPP-LTE and WiFi RATs. In other implementations, other possible RATs could be used.

As illustrated in FIG. 3, UE 110 may include 3GPP-LTE component 310 and WiFi component 320. The protocol stack for 3GPP-LTE component 310 of UE 110 may include: Non Access Stratum ("NAS") layer 311, RRC layer 312, Packet Data Convergence Protocol ("PDCP") layer 313, radio link control ("RLC") layer 314, MAC layer 315, and physical ("PHY") layer 316. The protocol stack for WiFi component 320 of UE 110 may include: Network Driver Interface Specification ("NDIS") intermedia ("IM") layer 321, MAC layer 322, and PHY layer 323. The 3GPP-LTE RAT and WiFi RAT of integrated AP 132 may include protocol layers that correspond to the protocol layers of UE 110.

Referring to 3GPP-LTE component 310, NAS layer 311 may represent the highest stratum of the control plane at the radio interface. An example of the functions performed by NAS layer 311 may include mobility support for UE 110 and support of session management procedures to establish and maintain IP connectivity between UE 110 and PGW 146. RRC layer 312 may perform control functions relating to the LTE air interface control plane. An example of the functions performed by RRC layer 312 may include: broadcasting of system information related to the NAS, broadcasting of system information related to the access stratum ("AS"), paging, security functions, mobility functions, and Quality of Service ("QoS") functions.

PDCP layer 313 may perform functions, such as for example, header compression and decompression of IP data, transfer of data (user plane or control plane), maintenance of PDCP sequence numbers ("SNs"), and/or other functions relating to the PDCP layer. RLC layer 314 may perform functions, relating to the LTE air interface control and user planes, such as transfer of upper layer packet data units, error correction, and in-sequence delivery of upper layer packet data units. MAC layer 315 may provide an interface to the network physical layer and may provide services such as channel access control services. PHY layer 316 may implement the basic networking hardware transmission technologies for 3GGP-LTE component 310.

Referring to WiFi component 320, NDIS IM layer 321 may represent an application programming interface ("API") for network interface devices. NDIS IM layer 321 may form the logical link control sublayer and may act as an interface to MAC layer 322. PHY layer 323 may implement the basic networking hardware transmission technologies for WiFi component 320.

In operation, 3GPP-LTE component 310 may maintain a connection with eNB 136 of integrated AP 132 (or with other eNBs). The connection may be an "always on" (or typically on) connection that corresponds to PCell connections for UE 110. WiFi component 320 may maintain "on demand" opportunistic connections with AP 138 of integrated AP 132. The on demand connections may correspond to SCell connections for UE 110. Control information relating to the on demand connections may be transmitted, to UE 110, via the PCell. In this manner, the 3GPP-LTE RAN may serve as a control and mobility anchor for WiFi WLANs. The WLAN may effectively be treated as a secondary carrier (layer 2 data pipe) for the primary carrier corresponding to the 3GPP network.

As is further illustrated in FIG. 3, signaling via RRC layers 312 ("Multi-RAT Aggregation/Coordination") may be used to coordinate the integration of the primary and secondary carriers. For example, RRC layer 312 may communicate with NDIS IM layer 321, or with other layers of WiFi 320, to support the integration of the primary and secondary carriers. In integrated AP 132, the multi-RAT aggregation/coordination link may correspond to link 137 (FIG. 1).

In order to effectively implement signaling via RRC layers 312 in order to coordinate the integration of the primary and secondary carriers, RRC signaling modifications, relative to existing RRC implementations, may be implemented with respect to the following functional areas:

(1) Integrated WLAN Advertisement and Discovery;
(2) Exchange of UE WLAN Capabilities;
(3) PCell Default Bearer Setup and WLAN Measurement and Reporting;
(4) Configuration of the SCell, Including Authentication and Association;
(5) Session Establishment over WLAN;
(6) Network Controlled Bearer Switching; and
(7) Mobility of Radio Bearers.

Regarding integrated WLAN advertisement and discovery, in one implementation, a UE in idle mode that is performing cell selection/reselection may select an eNB, such as eNB 136 of integrated AP 132, according to existing E-UTRAN association and cell selection procedures, such as procedures based on 3GPP link quality. That is, cell selection may involve selecting the primary LTE carrier (PCell) for operation.

After PCell selection, discovery of SCells may be performed using dedicated signaling over the PCell. The dedicated signaling may indicate the availability of WLAN APs that are operating as part of an integrated AP. In this manner, advertising of secondary WLAN APs, such as advertisement through broadcast system information signaling, may not be needed.

In some implementations, eNB 136 may advertise the capability of the eNB to support secondary WLAN carriers. UE 110 may use such knowledge in deciding whether to select a particular eNB for "camping" during idle mode operation of UE 110. For example, an eNB that supports secondary WLAN carriers may be weighted to be more likely to be used by the UE.

In some implementations, the indication of whether an eNB is associated with an integrated AP may be performed via a system information broadcast message. For example, a Boolean field (e.g., the Boolean field "WLANCapable") may be added to the 3GPP "System Information Block Type 1" ("SIB1") broadcast to indicate an eNB is associated with SCells.

Alternatively or additionally, in some implementations, eNB 136, of integrated AP 132, may advertise whether the corresponding WLAN AP 138 is capable of NSWO. The advertisement can be added as a Boolean field (e.g., the Boolean field "WlanNSWOCapable") to the SIB1 broadcast or to other SIBs. Alternatively, or additionally, in some implementation, the advertisement may be performed via one or more messages received from ANDSF 149.

In some situations, AP 138 may be configured for independent (non-integrated) operation with eNB 136 (and/or may include legacy mode portion 204, as described above with respect to FIG. 2). In this situation, eNB 136 may indicate the non-integrated state of AP 138 (and/or the presence of legacy mode portion 204) to UE 110. The exact decision to operate the system in an integrated or non-integrated mode may depend on several factors. For example, the number of dual mode UEs connected with the eNB, UE preferences for integrated mode operation, operator policies on the usage of co-located WLAN APs and/or on the usage and load of neighboring of WLAN APs.

Regarding the exchange of UE WLAN capabilities, in order for integrated AP 132 to be able to effectively use WLAN capabilities of UE 110, it may be desirable for eNB 136 to be able to query UE 110 to obtain an indication of the WLAN capabilities of UE 110. For example, it may be desirable for eNB 136 to determine whether UE 110 has available WiFi resources, WiFi protocols that are supported by UE 110, etc. The WLAN capabilities of UE 110 may be obtained via the primary carrier (i.e., via the PCell maintained through the LTE connection).

In one implementation, eNB 136 may query UE 110 for the WLAN capabilities of UE 110 after RRC connection establishment and set up of a signaling resource bearer (e.g., the bearer "SRB1"). The query can also be made after the establishment of default bearers on an as needed basis and may be made depending on several factors, such as, for example, network load conditions, a speed at which the UE is moving, or battery life of the UE. Alternatively or additionally, UE 110 may report the WLAN capabilities, of UE 110, as part of a UE capability reporting that is exchanged during a UE "attach" or "tracking area update ('TAU')" procedure.

Figure 4:
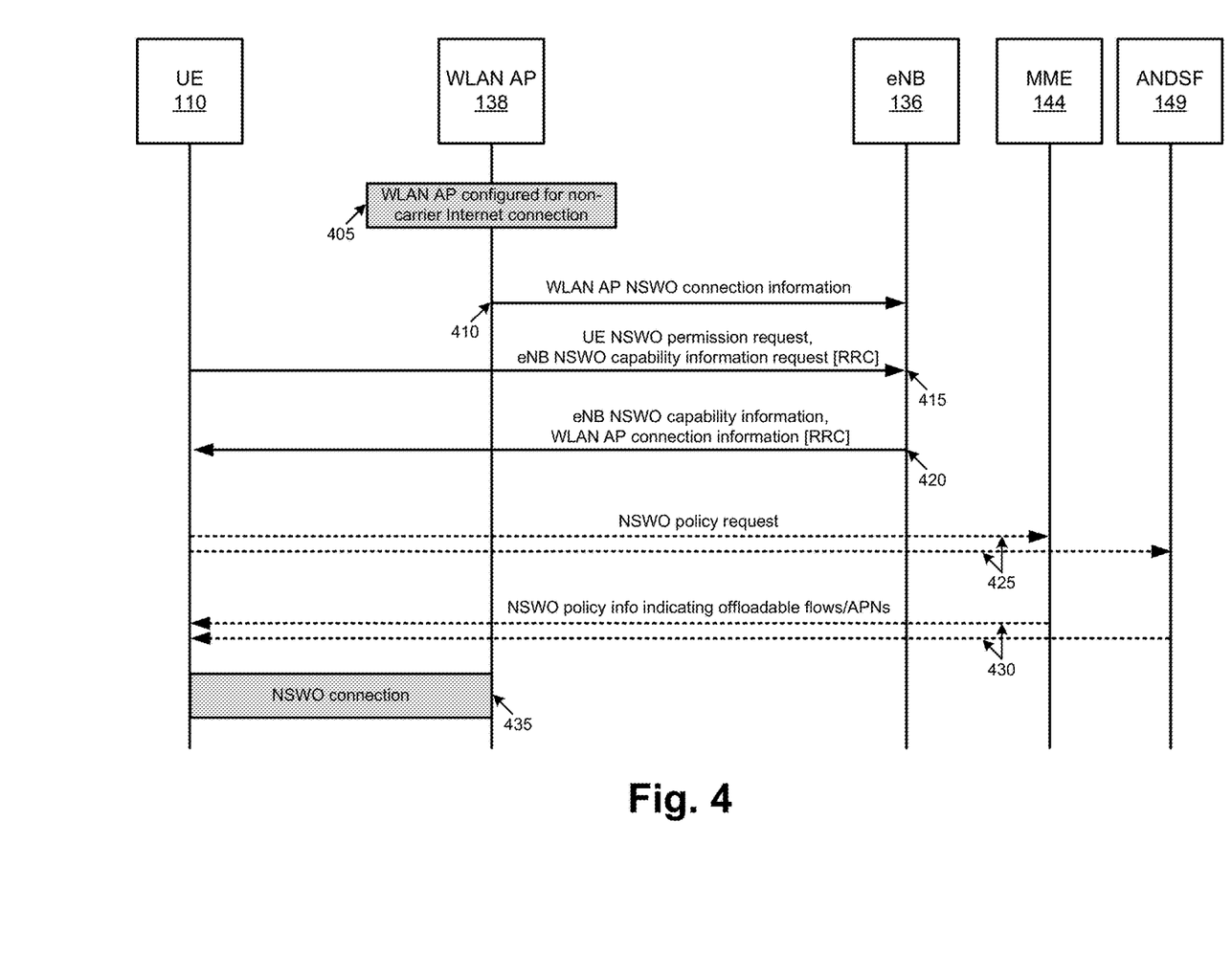
FIG. 4 is a diagram illustrating an example signal flow relating to non-seamless WLAN offload ("NSWO") being handled by an eNB.

FIG. 4 illustrates an example signal flow relating to NSWO in an integrated environment. As shown, WLAN AP 138, of integrated AP 132, may be configured (at 405) for a non-carrier Internet connection. For example, WLAN AP 138 may connect to PDN 150 via a modem or gateway associated with an Internet service provider ("ISP") that is separate from core network 140, and/or through another pathway that does not involve core network 140. In some implementations, WLAN AP 138 may, in some implementations, reserve a set of private IP addresses, designate a set of v-MACs to be used for NSWO, and/or designate one or more SSIDs to be used for NSWO.

WLAN AP 138 may provide (at 410) information that may be used to connect to WLAN AP 138 using NSWO. For example, WLAN AP 138 may provide (e.g., via link 137) information regarding the set of reserved IP addresses, the v-MAC(s), and/or the SSID(s) to be used for NSWO. WLAN AP 138 may also provide one or more security keys (e.g., a WiFi Protected Access ("WPA") security key associated with the SSID(s)). In some implementations, in addition to, or in lieu of receiving the information that may used to connect to WLAN AP 138, eNB 136 may determine and/or configure the information. For example, in some implementations, eNB 136 may configure the v-MAC(s), and provide the v-MAC(s) to WLAN AP 138.

At some point, UE 110 may request (at 415) permission to perform NSWO, and/or may request NSWO capability information from eNB 136 (e.g., whether eNB 136 supports NSWO). The request (at 415) may be sent, in some implementations, via RRC signaling. eNB 136 may determine whether UE 110 is authorized for NSWO. For example, in some implementations, eNB 136 may be configured to store identifiers of UEs 110 for which NSWO is authorized.

Additionally, or alternatively, eNB 136 may request authorization information (indicating whether UE 110 is authorized for NSWO) from another source, such as from MME 144, ANDSF 149, a component within core network 140, and/or another source.

As further shown, eNB 136 may respond (at 420) via RRC signaling (e.g., using an RRCReconfigurationRequest message), indicating whether UE 110 is authorized for NSWO and/or NSWO capability information (e.g., whether eNB 136 supports NSWO). eNB 136 may also provide (at 420) information used to connect to WLAN AP 138, using NSWO. For instance, eNB 136 may provide an SSID, a particular IP address (e.g., from the set of IP addresses), a v-MAC, a security key, etc. In some implementations, eNB 136 may not provide (at 420) an IP address. In some such situations, UE 110 may subsequently obtain an IP address, from WLAN AP 138, using Dynamic Host Configuration Protocol ("DHCP") and/or another technique.

UE 110 request (at 425) information regarding an NSWO policy. As shown, the request may be sent to MME 144 and/or to ANDSF 149, which may provide (at 430) NSWO policy information to UE 110. The NSWO policy information may indicate which flows may be offloaded. For example, the NSWO policy information may specify types of traffic (e.g., voice call traffic, Internet browsing traffic, video streaming traffic, etc.) that may be offloaded using NSWO. Additionally, or alternatively, the NSWO policy information may identify applications, for which traffic can be offloaded. As yet another example, the NSWO policy information may indicate Access Point Names ("APNs"), for which traffic may be offloaded. For instance, the NSWO policy information may specify that traffic, associated with the APN of one telecommunications provider, may be offloaded via NSWO, but that traffic, associated with the APN of another telecommunication provider, may not be offloaded via NSWO. In situations where UE 110 requests the NSWO policy information from MME 144, NAS signaling may be used to make the request and to provide the information to UE 110.

In addition to, and/or in lieu of, the NSWO policy information being requested (at 425) and provided (at 430), UE 110 may receive NSWO policy information at another time. For instance, UE 110 may be preconfigured with the NSWO policy information by a vendor and/or manufacturer of UE 110. Additionally, or alternatively, UE 110 may receive the NSWO policy information as part of a firmware update (e.g., an over-the-air ("OTA") update).

Based on the WLAN AP connection information (received at 420) and the NSWO policy information (received at 430), UE 110 may establish (at 435) a connection to WLAN AP, using NSWO. For instance, UE 110 may search for, and connect to, a designated SSID and use an associated WPA key to authenticate the UE 110 for the SSID.

Figure 5:
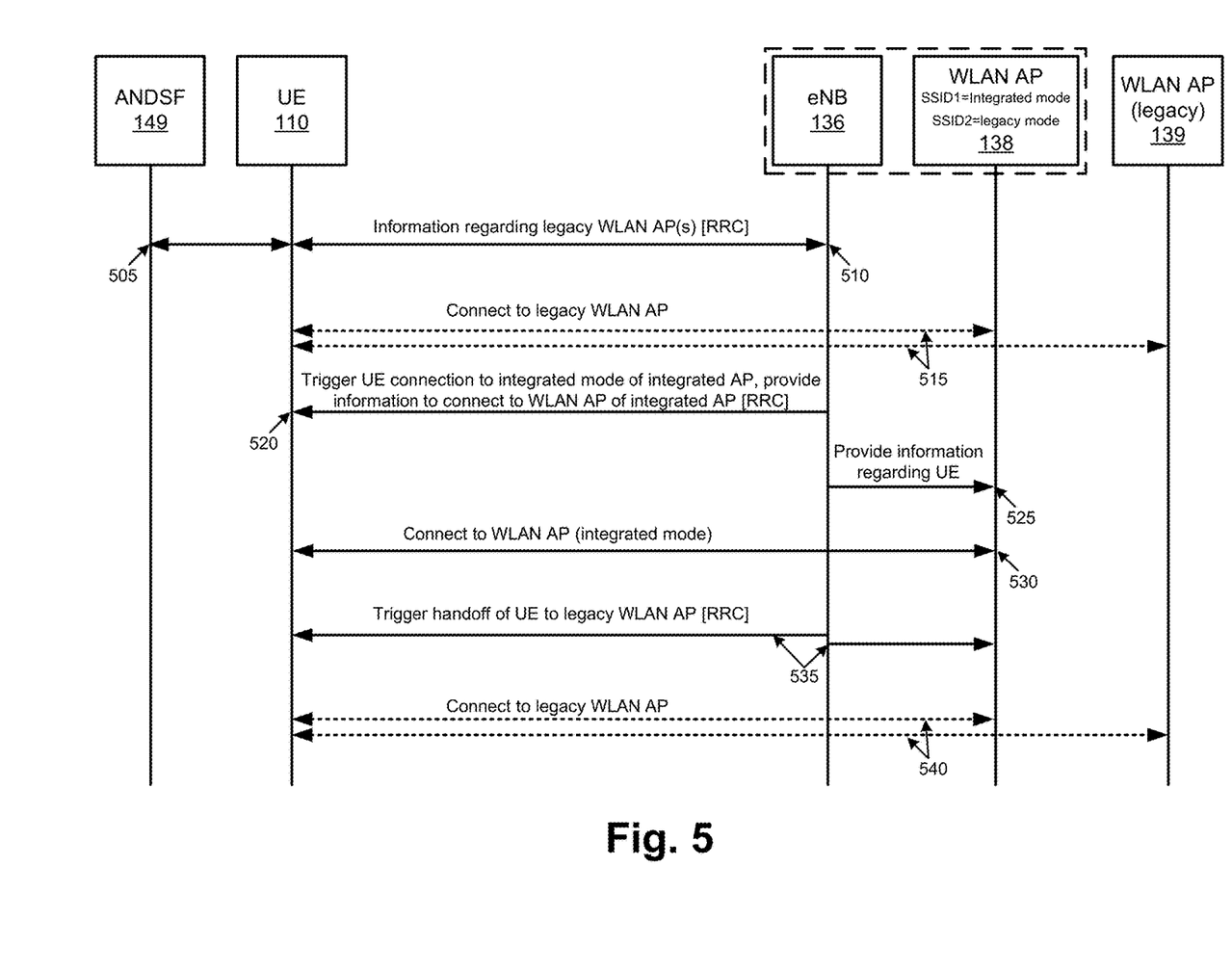
FIG. 5 is a diagram illustrating an example signal flow relating to the triggering of handovers between a WLAN AP, of an integrated AP, and a legacy WLAN AP.

FIG. 5 illustrates an example signal flow relating to the triggering of handovers between a WLAN AP, of an integrated AP (e.g., an integrated mode portion of WLAN AP 138), and a legacy WLAN AP (e.g., WLAN AP 139 and/or a legacy mode portion of WLAN AP 138). The example signal flow, shown in FIG. 5, may allow for the interworking of integrated APs 132 and legacy mode WLAN APs. Furthermore, in this example, control signaling may occur at the RAN level (e.g., handovers may be initiated by eNB 136), thereby reducing the burden on the core network (e.g., as compared to implementations in which one or more network devices, within core network 140, perform the control signaling).

As shown, UE 110 may receive information regarding one or more legacy WLAN APs. UE 110 may, in some implementations, receive (at 505) the information from ANDSF 149, and/or may receive (at 510) the information from eNB 136. For example, in some implementations, eNB 136 may broadcast and/or otherwise use dedicated signaling in order to provide (at 510) the information regarding the legacy WLAN AP. The information, provided by ANDSF 149 and/or eNB 136, may include information that may be used to identify and/or connect to a particular legacy WLAN AP, such as an SSID of the WLAN AP (e.g., an SSID associated with a legacy portion of WLAN AP 138), a security key necessary to connect to the WLAN AP, and/or a v-MAC used by WLAN AP 138 to carry traffic in legacy mode (e.g., via an S2 interface).

As further shown, UE 110 may connect (at 515) to a legacy WLAN AP (e.g., a legacy mode portion of WLAN AP 138 or to legacy WLAN AP 139). In some implementations, the connection between UE 110 and the legacy WLAN AP may be made using WLAN control plane ("WLCP") signaling. In some implementations, WLAN AP 138 may have the same SSID for integrated mode and legacy mode. In some such implementations, WLAN AP 138 may determine that legacy mode should be used for the connection based on a v-MAC specified by UE 110 when connecting (at 515) to WLAN AP 138. As mentioned above, the legacy WLAN AP may, in some implementations, communicate with PGW 146 via an S2 interface.

At some point, eNB 136 may determine that UE 110 should be handed over to WLAN AP 138 (e.g., to an integrated mode portion of WLAN AP 138). Based on this determination, eNB 136 may trigger (at 520) a connection to the integrated mode portion of WLAN AP 138. In some implementations, eNB 136 may provide information that may be used to connect to WLAN AP 138 (or the integrated mode portion of WLAN AP 138), such as an SSID associated with WLAN AP 138, a Basic SSID ("BSSID") associated with WLAN AP 138, a Homogenous Extended SSID ("HESSID") associated with WLAN AP 138, and/or a v-MAC associated with WLAN AP 138. As shown, the trigger may be sent to UE 110 using RRC signaling.

As further shown, eNB 136 may provide (at 525) information to WLAN AP 138, regarding UE 110. This information may indicate, to WLAN 138, that UE 110 should be allowed to connect to WLAN 138. For example, eNB 136 may provide (e.g., via link 137) a MAC address, security keys, and/or another type of identifier or authentication information, regarding UE 110, to WLAN AP 138. Based on this information, WLAN AP 138 may store information indicating that UE 110 is authorized to connect to WLAN AP 138. For example, WLAN AP 138 may place the MAC address of UE 110 on a MAC access list.

Using the information provided (at 520) by eNB 136, UE 110 may connect (at 530) to WLAN AP 138 (e.g., an integrated mode of WLAN AP 138). When connected to WLAN AP 138, traffic associated with UE 110 may be tunneled, through WLAN AP 138, to and/or from SGW 142 (e.g., via eNB 136). WLAN AP 138 may, in some implementations, determine that UE 110 is authorized to connect to WLAN AP 138, by using the information provided at 525.

Subsequent to the connection of UE 110 to WLAN AP 138, eNB 136 may trigger (at 535) a handoff of UE 110 from WLAN AP 138 (e.g., an integrated mode of WLAN AP 138) to a legacy WLAN AP (e.g., WLAN AP 139 or a legacy mode portion of WLAN AP 138). In some implementations, eNB 136 may provide information regarding the legacy WLAN AP (e.g., SSID, BSSID, HESSID, v-MAC, security key, etc.) to UE 110 (e.g., via RRC signaling). In some implementations, eNB 136 may signal WLAN AP 138, indicating that UE 110 should be handed off from WLAN AP 138. In some such implementations, WLAN AP 138 may disconnect from UE 110.

As part of the handoff, eNB 136 may further provide (at 535) information to WLAN AP 138, indicating that UE 110 is being handed off from WLAN AP 138. Based on this information, WLAN AP 138 may disconnect UE 110 from WLAN AP 138. For instance, WLAN AP 138 may remove UE 110 from a MAC access list associated with WLAN AP 138.

Once the handoff is triggered (at 535), UE 110 may connect (at 540) to a legacy WLAN AP. For instance, in implementations where information regarding the legacy WLAN AP was provided by eNB 136, UE 110 may use the information to identify and connect to the legacy WLAN AP. In implementations where such information was not provided (e.g., an implementation in which eNB signals WLAN AP 138 to disconnect from UE 110), UE 110 may identify and connect to the legacy WLAN AP 138 using some other technique.

Figure 6:
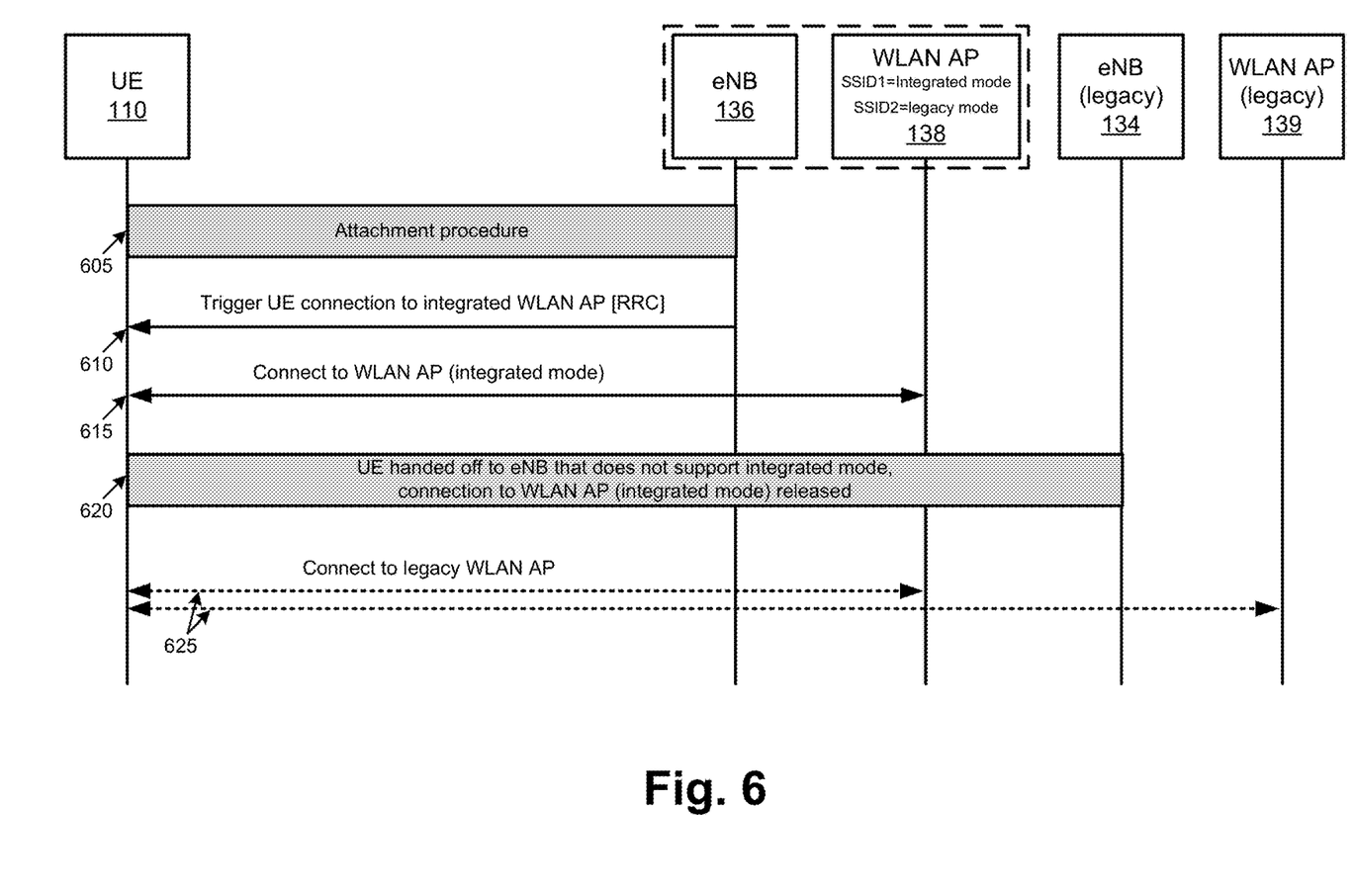
FIG. 6 is a diagram illustrating an example signal flow relating to the handoff of a UE from an eNB, of an integrated AP, to a legacy eNB.

FIG. 6 is a diagram illustrating an example signal flow relating to the handoff of a UE from an eNB, of an integrated AP, to a legacy eNB. As shown, UE 110 and eNB 136 may perform an attachment procedure. As mentioned above, eNB 136 may be an eNB that is associated with integrated AP 132. Once UE 110 is attached to eNB 136, eNB 136 may trigger (at 610) a connection of UE 110 to an integrated WLAN AP (e.g., to WLAN AP 138, and/or to an integrated mode portion of WLAN AP 138). For instance, eNB 136 may send the trigger via RRC signaling, which may include an instruction and/or connection information, which may be used to identify and/or connect to WLAN AP 138. While not explicitly shown in this figure, eNB 136 may communicate with WLAN AP 138, in conjunction with triggering the UE connection to WLAN AP 138. For example, eNB 136 may provide information, to WLAN AP 138, regarding UE 110, which may facilitate the connection between WLAN AP 138 and UE 110 (e.g., in a manner similar to that described above with respect to item 525 of FIG. 5).

The connection information (provided at 610) may include, for example, an SSID, a BSSID, an HESSID, a v-MAC, a WiFi security key, and/or other information that may be used to connect to WLAN AP 138. Additionally, or alternatively, UE 110 may receive some, or all, of the information, used for connecting to WLAN AP 138, from another source, such as ANDSF 149. In some implementations, UE 110 may receive connection information, used for connecting to WLAN AP 138, prior to eNB 136 triggering (at 610) the connection to WLAN AP 138. For example, UE 110 may receive the connection information as part of the attachment procedure, and/or at a time in between the attachment procedure and the trigger. UE 110 may use the information to connect to WLAN AP 138 (and/or to an integrated mode portion of WLAN AP 138, such as by connecting to an SSID that is associated with the integrated mode portion).

At some point, UE 110 may be handed off (at 620) to a legacy eNB (i.e., eNB 134, in this example). Based on UE 110 being handed off from eNB 136, the connection between UE 110 and WLAN AP 138 may be released. For instance, eNB 136 may signal UE 110 (e.g., via RRC signaling) to disconnect from WLAN AP 138. Additionally, or alternatively, eNB 136 may signal WLAN AP 138 to disconnect from UE 110 (for example, a MAC address associated with UE 110 may be removed from a MAC access list associated with the integrated mode portion of WLAN AP 138). In some situations, UE 110 may be disconnected from WLAN AP 138 due to being out of range of WLAN 138.

In some implementations, eNB 136 may determine that eNB 134 is a legacy eNB by communicating with eNB 134 via an X2 interface. For instance, eNB 136 may request information, from eNB 134, regarding whether eNB 134 supports an integrated mode. eNB 134 may reply that eNB 134 does not support an integrated mode, or may reply with an error message (e.g., in case eNB 134 does not recognize the request for information), and/or eNB 136 may not receive a reply from eNB 134. Based on this reply (or failure to receive a reply), the determination may be made by eNB 136 that eNB does not support an integrated mode. In this scenario, UE 110 may, in some implementations, still be handed off to eNB 134. UE 110 may then use legacy signaling to hand over between eNB 134 and an alternate WLAN not operating in integrated mode (e.g., a legacy WLAN AP). The alternate WLAN carrier associated with eNB 136 may be released once the handover from eNB 136 is completed.

Once UE 110 has been disconnected (at 620) from WLAN AP 138, UE 110 may connect to a legacy WLAN AP, such as a legacy mode portion of WLAN AP 138 or to legacy WLAN AP 139. In some implementations, while not explicitly shown in the figure, UE 110 may receive information (e.g., SSID, BSSID, HESSID, v-MAC, security key, etc.) regarding the legacy WLAN AP from eNB 136 and/or from ANDSF 149 (e.g., in a manner similar to that described above with respect to item 505 of FIG. 5).

Figure 7:
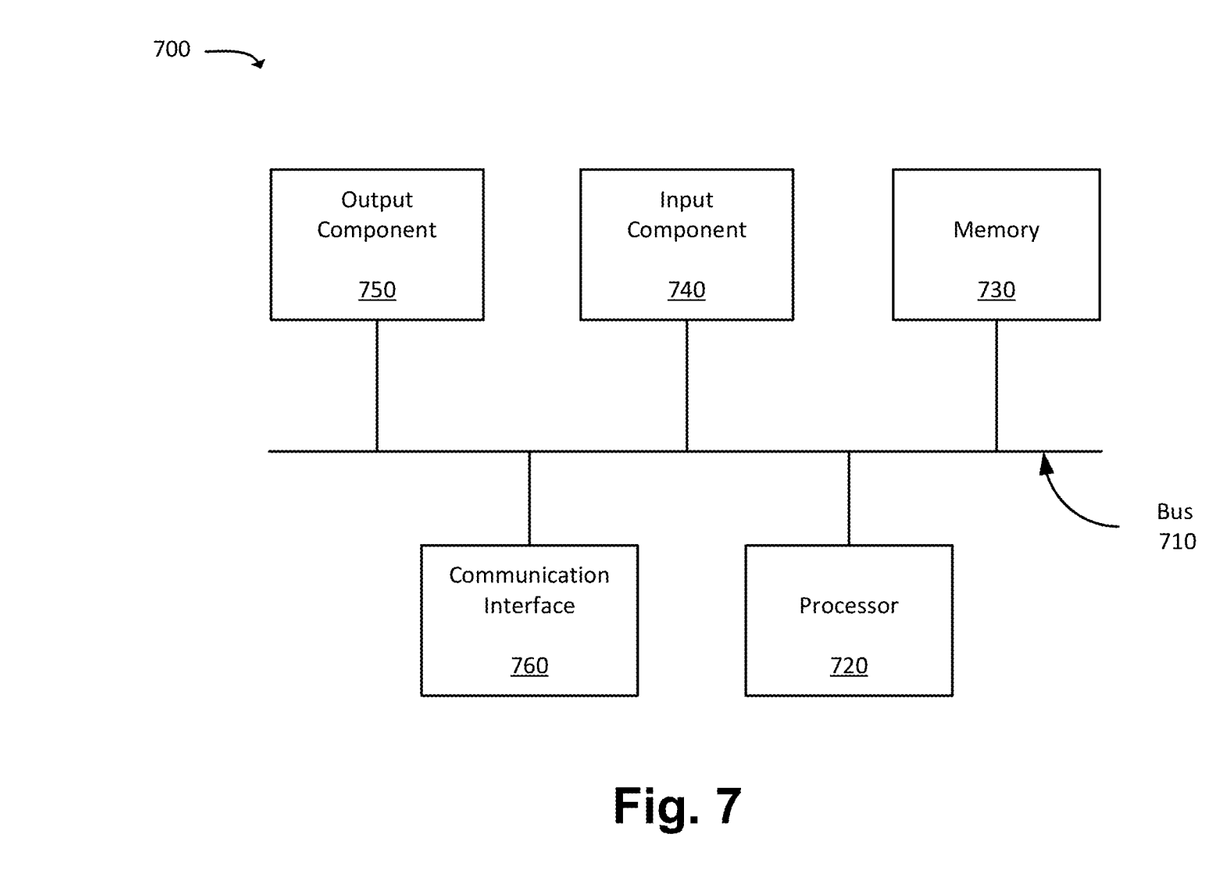
FIG. 7 is a diagram of example components of a device.

FIG. 7 is a diagram of example components of a device 700. Some of the devices illustrated in FIGS. 1-3 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include processing circuitry, such as a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of signals have been described with regard to FIGS. 4-6, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
    a base station radio interface comprising a wireless wide area network radio interface wherein the base station radio interface is associated with a wireless telecommunications network, to communicate with a user equipment ("UE") using Radio Resource Control ("RRC") signaling;
    a wireless local area network ("WLAN") radio interface to communicate with the UE using unlicensed frequency spectrum; and
    processing circuitry to execute processor-executable instructions, wherein executing the processor-executable instructions causes the system to:
        establish, by the WLAN radio interface, connection to a packet data network ("PDN") via an internet service provider ("ISP");
        provide, by the WLAN radio interface, and to the base station radio interface, WLAN connection information, the WLAN connection information specifying parameters associated with connecting to the WLAN radio interface using the unlicensed frequency spectrum;
        receive, by the base station radio interface from the UE, a request to perform a Non-Seamless WLAN Offload ("NSWO") procedure;
        provide, by the base station radio interface to the UE via RRC signalling, based on the request to perform the NSWO procedure, the WLAN connection information, wherein the WLAN connection information identifies that only a subset of data is to be offloaded based on one or more policies; and
        establish, by the WLAN radio interface, a WLAN connection with the UE in accordance with the NSWO procedure being performed by the UE and the one or more policies.

2. The system of claim 1, wherein the WLAN connection information includes at least one of:
    a Service Set Identifier ("SSID") associated with the WLAN radio interface;
    a Basic SSID ("BSSID") associated with the WLAN radio interface;
    a Homogeneous Extended SSID ("HESSID") associated with the WLAN radio interface;
    a virtual Media Access Control ("v-MAC") value associated with the WLAN radio interface; or
    a security key associated with the WLAN radio interface.

3. The system of claim 1, wherein the WLAN radio interface is additionally configured to connect to the PDN via a core network of the wireless telecommunications network.

4. The system of claim 3, wherein the WLAN connection information is first WLAN connection information that is designated for NSWO procedures,
    wherein the WLAN radio interface is associated with second WLAN connection information that is designated for connecting to the PDN via the core network, wherein traffic, associated with connections made using the second WLAN connection information, is sent to the PDN via the core network through at least one of:
    an S2 interface, or
    an S1 interface, via an evolved node B ("eNB") associated with the wireless telecommunications network.

5. The system of claim 1, wherein the request from the UE, to perform the NSWO procedure, is received via RRC signaling.

6. The system of claim 1, wherein the WLAN connection information comprises policy information from a Mobility Management Entity ("MME") or an Access Network Discovery and Selection Function ("ANDSF") corresponding to the one or more policies, and the subset of the data corresponds to at least one of:
    a type of traffic that is authorized to be offloaded using an NSWO procedure,
    an application for which traffic is authorized to be offloaded using an NSWO procedure, or
    an Access Point Name ("APN") for which traffic is authorized to be offloaded using an NSWO procedure.

7. The system of claim 1, wherein the base station radio interface communicates with the WLAN radio interface via a modified X2 interface.

8. A user equipment ("UE") apparatus, comprising:
    a wireless wide area network ("WWAN") radio interface to connect to a wireless telecommunications network using licensed frequency spectrum;
    a wireless local area network ("WLAN") radio interface to connect to one or more wireless access points ("APs") using unlicensed frequency spectrum; and
    processing circuitry to execute processor-executable instructions, wherein executing the processor-executable instructions causes the UE apparatus to:
        connect, by the WLAN radio interface, to a first WLAN AP;
        receive, by the WWAN radio interface and via Radio Resource Control ("RRC") signaling, WLAN connection information regarding a second WLAN AP, wherein the WLAN connection information identifies that only a subset of data is to be offloaded according to a Non-Seamless WLAN Offload ("NSWO") procedure and based on one or more policies; and
        connect, by the WLAN radio interface and using the WLAN connection information, to the second WLAN AP.

9. The UE apparatus of claim 8, wherein executing the processor-executable instructions further causes the UE apparatus to:
    receive, by the WWAN radio interface, an instruction to release the connection to the second WLAN AP; and
    release, by the WLAN radio interface and based on the received instruction, the connection to the second WLAN AP.

10. The UE apparatus of claim 9, wherein the instruction is received via RRC signaling.

11. The UE apparatus of claim 9, wherein after releasing the connection to the second WLAN AP, the UE apparatus connects to the first WLAN AP.

12. The UE apparatus of claim 8, wherein the first WLAN AP communicates with a Packet Data Network ("PDN") Gateway ("PGW") of the wireless telecommunications network via an S2 interface, and
    wherein the second WLAN AP communicates with the PGW via a base station of the wireless telecommunications network.

13. The UE apparatus of claim 8, wherein the first WLAN AP and the second WLAN AP correspond to different logical portions of an integrated AP.

14. The UE apparatus of claim 12, wherein the second WLAN AP is associated with the WLAN connection information, wherein the WLAN connection information includes at least one of:
    a Service Set Identifier ("SSID") associated with the WLAN radio interface;
    a Basic SSID ("BSSID") associated with the WLAN radio interface;

a Homogeneous Extended SSID ("HESSID") associated with the WLAN radio interface;

a virtual Media Access Control ("v-MAC") value associated with the WLAN radio interface; or a security key associated with the WLAN radio interface.

15. The UE apparatus of claim 12, wherein executing the processor-executable instructions further causes the UE apparatus to:

receive, by the WWAN radio interface and via RRC signalling, WLAN connection information regarding the first WLAN AP;

wherein the UE apparatus uses the WLAN connection information, regarding the first WLAN AP, to connect to the first WLAN AP.

16. The UE apparatus of claim 12, wherein executing the processor-executable instructions further causes the UE apparatus to:

receive, from an Access Network Discovery and Selection Function, WLAN connection information regarding the first WLAN AP, wherein the UE apparatus uses the WLAN connection information, regarding the first WLAN AP, to connect to the first WLAN AP.

17. A user equipment ("UE") apparatus, comprising:

a wireless wide area network ("WWAN") radio interface to connect to one or more wireless telecommunications networks using licensed frequency spectrum;

a wireless local area network ("WLAN") radio interface to connect to one or more wireless access point ("APs") using unlicensed frequency spectrum; and processing circuitry to execute processor-executable instructions, wherein executing the processor-executable instructions causes the UE apparatus to:

connect, by the WWAN radio interface, to a first base station of the one of more wireless telecommunications networks;

receive, by the WWAN radio interface, WLAN connection information regarding a particular WLAN AP, wherein the WLAN connection information identifies that only a subset of data is to be offloaded according to a Non-Seamless WLAN Offload ("NSWO") procedure and based on one or more policies;

connect, by the WLAN radio interface and using the WLAN connection information, to the particular WLAN AP based on the one or more policies;

connect, based on a handover procedure, to a second base station of the one or more wireless telecommunications networks; and terminate, based on the handover procedure, the connection to a particular WLAN AP.

18. The UE apparatus of claim 17, wherein executing the processor-executable instructions further causes the UE apparatus to:

connect, subsequent to terminating the connection to the particular WLAN AP, to another WLAN AP, another WLAN AP.

19. The UE apparatus of claim 17, wherein the connection to the particular WLAN AP is terminated based on information, provided to the particular WLAN AP from the first base station, that the UE has been handed off from the first base station.

20. The UE apparatus of claim 17, wherein the WLAN connection information is received from the base station via Radio Resource Control ("RRC") signaling.

21. The UE apparatus of claim 17, wherein the handover procedure is based on one or more protocols suitable for connectivity via an S2 interface.

22. A user equipment ("UE") apparatus, comprising:

wireless wide area network ("WWAN") radio interface for connecting to one or more wireless telecommunications networks using licensed frequency spectrum;

wireless local area network ("WLAN") radio interface for connecting to one or more wireless access points ("APs") using unlicensed frequency spectrum; and processing means for executing processor-executable instructions, wherein executing the processor-executable instructions causes the UE apparatus to:

connect, by the WWAN radio interface, to a first base station of the one of more wireless telecommunications networks;

receive, by the WWAN radio interface, WLAN connection information regarding a particular WLAN AP, wherein the WLAN connection information identifies that only a subset of data is to be offloaded according to a Non-Seamless WLAN Offload ("NSWO") procedure and based on one or more policies;

connect, by the WLAN radio interface and using the WLAN connection information, to the particular WLAN AP based on the one or more policies;

connect, based on a handover procedure, to a second base station of the one or more wireless telecommunications networks; and terminate, based on the handover procedure, the connection to the particular WLAN AP.

23. The UE apparatus of claim 22, wherein the connection to the particular WLAN AP is terminated based on information, provided to the particular WLAN AP from the first base station, that the UE has been handed off from the first base station.

24. The UE apparatus of claim 22, wherein the WLAN connection information is received from the base station via Radio Resource Control ("RRC") signaling.

* * * * *

UNITED STATES PATENT AND TRADEMARK OFFICE
CERTIFICATE OF CORRECTION

PATENT NO. : 10,142,894 B2
APPLICATION NO. : 14/583336
DATED : November 27, 2018
INVENTOR(S) : Nageen Himayat et al.

Page 1 of 1

It is certified that error appears in the above-identified patent and that said Letters Patent is hereby corrected as shown below:

In the Claims

In Column 19, Line 29, in Claim 17, delete "point;" and insert -- points --, therefor.

In Column 19, Line 35, in Claim 17, delete "one of more;" and insert -- one or more --, therefor.

In Column 20, Line 2, in Claim 18, after "to" delete "another WLAN AP,", therefor.

In Column 20, Line 27, in Claim 22, delete "one of more;" and insert -- one or more --, therefor.

Signed and Sealed this
Twenty-second Day of January, 2019

Andrei Iancu
*Director of the United States Patent and Trademark Office*